United States Patent [19]

Tomiyama

[11] Patent Number: 5,677,083
[45] Date of Patent: Oct. 14, 1997

[54] NON-AQUEOUS LITHIUM ION SECONDARY BATTERY

[75] Inventor: Hideki Tomiyama, Kanagawa, Japan

[73] Assignee: Fuji Photo Film Co., Ltd., Kanagawa, Japan

[21] Appl. No.: 769,525

[22] Filed: Dec. 19, 1996

[30] Foreign Application Priority Data

Dec. 19, 1995 [JP] Japan .................. 7-330116

[51] Int. Cl.$^6$ .................................. H01M 6/14
[52] U.S. Cl. .......................... 429/194; 429/218
[58] Field of Search ............................ 429/194, 218, 429/209, 232, 66, 94; 252/182.1

[56] References Cited

U.S. PATENT DOCUMENTS 4,828,834  5/1989  Nagaura et al. ................ 429/194
5,240,794  8/1993  Thackeray et al. .............. 429/224
5,296,319  3/1994  Bito et al. ....................... 429/194

FOREIGN PATENT DOCUMENTS h582131  4/1993  Japan .

*Primary Examiner*—Anthony Skapars
*Attorney, Agent, or Firm*—Sughrue, Mion, Zinn, Macpeak and Seas

[57] ABSTRACT

In a non-aqueous lithium ion secondary battery comprising a positive electrode sheet which comprises a lithium-containing transition metal oxide film, a negative electrode sheet which has a film of material capable of receiving and releasing a lithium ion, a non-aqueous electrolyte which contains a lithium salt, and a container which seals the electrodes and electrolyte therein, the lithium-containing transition metal oxide film comprises at least two layers, one of which expands during discharging while shrinks during charging, and another of which shrinks during discharging while expands during charging.

9 Claims, 1 Drawing Sheet

F I G. 1

NON-AQUEOUS LITHIUM ION SECONDARY BATTERY

FIELD OF THE INVENTION

This invention relates to a non-aqueous lithium ion secondary battery.

BACKGROUND OF THE INVENTION

A non-aqueous lithium ion secondary battery which is able to give a high voltage and a high discharge capacity has recently been paid much attention, because it is advantageously employable as electric source for electronic devices of small size such as video cameras and handy personal computers. Recent development of the electronic devices demands further increase of discharge capacity. The discharge capacity can be increased by charging an increased amount of electrode active materials in the container of the secondary battery. However, the electrode materials of such an increased amount are apt to leak outside because of their expansion occurring in the course of charge and discharge cycles. Further, such expansion may cause to shorten the battery life for charge-discharge cycle. Therefore, the increase of the amounts of electrode active materials should be limited to a certain extent.

Japanese Patent Provisional Publication No. H5-82131 describes a non-aqueous electrolyte secondary battery using a positive active material of intercalation type comprising a mixture of an active material whose crystal structure expands during discharging and shrinks during charging and another active material whose crystal structure shrinks during discharging and expands during charging. The former active material may be $Li_{1-x}Mn_2O_4$ ($0 \leq x \leq 1$) of spinel structure, and the latter active material may be $Li_{1-x}CoO_2$ ($0 \leq x \leq 1$). The above-identified Publication further defines that the negative electrode active material is lithium, or carbonaceous material or alloy which is capable of absorbing and releasing lithium.

The invention described in the Publication appears to be based on an idea that one of the positive active electrode materials expands and shrinks to compensate the volume change of another positive active electrode material.

I have studied the invention and noted that the expected compensation of the volume change of one electrode material by another electrode material does not always works appropriately so that leakage of the electrolyte material and/or shortened charge-discharge cycle are sometimes observed. The reasons of such troubles are considered as follows. It is not easy to uniformly prepare a slurry of particles of two or more kinds of electrode materials (namely, metal oxide particles) in an aqueous medium, because the different metal oxide particles have different physical and chemical characteristics. In thus prepared non-uniform electrode layer, the expected compensation of the volume change during the charge-discharge cycle cannot work appropriately. Further, even if the electrode layer is prepared very uniformly, it is likely that electric characteristics of one electrode material does not work satisfactorily when another material is arranged in contact therewith.

SUMMARY OF THE INVENTION

It is an object of the present invention to provide a non-aqueous lithium ion secondary battery which shows a high initial electric capacity as well as a long charge-discharge cycle life, being almost free from trouble of electrolyte leakage.

There is provided by the present invention a non-aqueous lithium ion secondary battery comprising a positive electrode sheet which comprises a lithium-containing transition metal oxide film, a negative electrode sheet which has a film of material capable of receiving and releasing a lithium ion, a non-aqueous electrolyte which contains a lithium salt, and a container which seals the electrodes and electrolyte therein, wherein the lithium-containing transition metal oxide film comprises at least two layers, one of which expands during discharging while shrinks during charging, and another of which shrinks during discharging while expands during charging.

PREFERRED EMBODIMENTS OF THE INVENTION

The preferred embodiments of the non-aqueous lithium ion secondary battery of the invention are set forth below.

(1) The non-aqueous lithium ion secondary battery, wherein one of the two layers comprises a lithium-containing manganese oxide of a spinel structure, while another comprises a lithium-containing cobalt oxide.

(2) The non-aqueous lithium ion secondary battery, wherein one of the two layers comprises a lithium-containing manganese oxide of a spinel structure which is represented by $Li_{2-x}Mn_2O_4$ wherein x is a number satisfying the condition of $0 \leq x \leq 2$, while another comprises a lithium-containing cobalt oxide represented by $Li_{1-y}CoO_2$ wherein y is a number satisfying the condition of $0 \leq y \leq 1$.

(3) The non-aqueous lithium ion secondary battery, wherein the film of material capable of receiving and releasing a lithium ion comprises an oxide or a chalcogenide comprising at least one element selected from the group consisting of Al, Ga, Si, Sn, Ge, Pb, Sb, and Bi.

(4) The non-aqueous lithium ion secondary battery, wherein the film of material capable of receiving and releasing a lithium ion comprises a complex oxide having the formula:

$$SnM^1_aO_t$$

in which $M^1$ comprises at least two elements selected from the group consisting of Al, B, P, Si, Ge, Pb, Li, Na, K, Rb, Cs, Mg, Ca, Ba, and F; and "a" and "t" are numbers satisfying the conditions of $0.2 \leq a \leq 2$ and $1 \leq t \leq 6$, respectively.

(5) The non-aqueous lithium ion secondary battery, wherein the film of material capable of receiving and releasing a lithium ion comprises a complex oxide having the formula:

$$SnM^3_cM^4_dO_t$$

in which $M^3$ is at least one element selected from the group consisting of Al, B, P, Ge; $M_4$ is at least one element selected from the group consisting of Li, Na, K, Rb, Cs, My, Ca, Ba, and F; "c" and "d" are numbers satisfying the conditions of $0.2 \leq c \leq 2$, $0.01 \leq d \leq 1$, and $0.2 \leq c+d \leq 2$; and "t" is a number satisfying the condition of $1 \leq t \leq 6$.

(6) The non-aqueous lithium ion secondary battery, wherein the lithium-containing transition metal oxide film comprising at least two layers is prepared by simultaneous double coating of at least two slurries containing lithium-containing transition metal oxides differing from each other.

(7) A non-aqueous lithium ion secondary battery comprising a positive electrode sheet which comprises a lithium-containing transition metal oxide film, a negative electrode sheet which has a film of material capable of receiving and releasing a lithium ion, a non-aqueous electrolyte which contains a lithium salt, and a container which seals the electrodes and electrolyte therein, wherein the lithium-containing transition metal oxide film comprises three layers which are composed of two layers expanding during discharging while shrinking during charging, and one layer shrinking during discharging while expanding during charging, the last layer intervening between the former two layers.

(8) A non-aqueous lithium ion secondary battery comprising a positive electrode sheet which comprises a lithium-containing transition metal oxide film, a negative electrode sheet which has a film of material capable of receiving and releasing a lithium ion, a non-aqueous electrolyte which contains a lithium salt, and a container which seals the electrodes and electrolyte therein, wherein the lithium-containing transition metal oxide film comprises three layers which are composed of two layers shrinking during discharging while expanding during charging, and one layer expanding during discharging while shrinking during charging, the last layer intervening between the former two layers.

The non-aqueous lithium ion secondary battery of the invention is described below in more detail.

The positive electrode active materials employed in the invention are lithium-containing transition metal oxides. Examples of the transition metals include Ti, V, Cr, Mn, Fe, Co, Ni, Cu, Nb, and W. Preferred transition metal oxides are manganese dioxide, vanadium oxide, ferric oxide, molybdenumtrioxide, molybdenum sulfide, cobalt oxide, ferric sulfide, and titanium sulfide. These transition metal oxides can be employed singly or in combination after incorporation of lithium. The lithium-containing transition metal oxide can be produced by firing a mixture of a transition metal oxide and a lithium-containing compound.

The positive electrode active material can further contain an ion carrier such as $Ca^{2+}$ and an amorphous matrix-forming agents containing P, B, Si, and the like (e.g., $P_2O_5$, $Li_3PO_4$, $H_3BO_3$, $B_2O_3$, and $SiO_2$). Alkali metals such as Na and K, and other metals such as Mg, Sn, Al, Ga, Ge, Ce, In and Bi can be incorporated. These elements can be incorporated by adding a compound containing one or more of the elements to the mixture of a transition metal oxide and a lithium-containing compound, and then firing thus obtained mixture.

Examples of the positive electrode active material preferably employable in the invention include $Li_xCoO_2$, $Li_xNiO_2$, $Li_xCo_aNi_{1-a}O_2$, $Li_xCo_bV_{1-b}O_z$, $Li_xCo_bFe_{1-b}O_z$, $Li_xMn_2O_4$, $Li_xMnO_2$, $Li_xMn_2O_3$, $Li_xMn_bCo_{2-b}O_z$, $Li_xMn_bNi_{2-b}O_z$, $Li_xMn_bV_{2-b}O_z$, $Li_xN_bFe_{1-b}O_2$, $Li_xCo_bB_{1-c}O_2$: x=0.5–1.2, a=0.1–0.9, b=0.8–0.98, c=0.85–0.99, and z=1.5–5. Other preferred examples of the positive electrode active material are described in Japanese Patent Provisional Publications No. 61-5262, No. 63-299056, No. H1-294364, No. H4-328258 and No. H5-54889; Japanese Patent Publication No. H4-30146; and U.S. Pat. Nos. 4,302,518, 5,240,794 and No. 5,153,081.

A preferred example of the lithium-containing transition metal oxide which expands during discharging (i.e., when the lithium ion is intercalated) while shrinks during charging (i.e., when the lithium ion is released) is a lithium-containing manganese oxide of spinel structure. A preferred example of the lithium-containing transition metal oxide which shrinks during discharging while expands during charging is a lithium-containing cobalt oxide.

The lithium-containing manganese oxide of spinel structure is preferably represented by $Li_{2-x}Mn_2O_4$ wherein x is a number satisfying the condition of $0 \leq x \leq 2$, more specifically $Li_{1-x}Mn_2O_4$ wherein x is a number satisfying the condition of $0 \leq x \leq 1$. The lithium-containing cobalt oxide is preferably represented by $Li_{1-y}CoO_2$ wherein y is a number satisfying the condition of $0 \leq y \leq 1$.

The positive electrode active material of the invention can be produced from a mixture of a lithium-containing metal, a transition metal-containing compound, and one or more of other optionally employable compounds by reacting these in a solution or firing. The firing process is preferably adopted. Details of the preferably employable firing process are described in Japanese Patent Provisional Publication No. H6-60867, particularly at the portion of [0035], as well as in Japanese Patent Provisional Publication No. H7-14579.

The temperature preferably employable for the firing is in the range of 500° to 1,500° C., more preferably 700° to 1,200° C. The temperature in the range of 750° to 1,000° C. is most preferred. The period preferably employable for the firing is in the range of 4 to 30 hours, more preferably 6 to 20 hours. The period in the range of 6 to 15 hours is most preferred.

The positive electrode active material produced by the firing process can be employed after it is washed with water, an aqueous acidic solution, an aqueous alkaline solution, or an organic solvent.

Otherwise, the lithium ion can be chemically incorporated into the transition metal oxide by the reaction of a lithium metal (or lithium alloy or butyllithium) and a transition metal oxide. Further, the lithium ion can be electrochemically incorporated into a transition metal oxide.

The positive electrode active material is preferably employed in the form of particles. There is no specific limitation with respect to the size of the particles, but the particle size preferably is in the range of 0.1 to 50 μm. More preferably, more than 95 vol. % of the particles have a size in the range of 0.5 to 30 μm. Among such particles, most preferred are as follows: particles having a size of less than 3 μm is 18 vol. % (based on the total volumes of the whole particles) or less, and particles having a size in the range of 15 to 25 μm is 18 vol. % (based on the total volumes of the whole particles) or less. There is no specific limitation with respect to their specific surface area, but the range of 0.01 to 50 $m^2/g$ (according to BET method) is preferred, and 0.2 to 1 $m^2/g$ is most preferred. In addition, the positive electrode active material preferably gives pH value in the range of 7 to 12, when 5 g of the material is dissolved in 100 mL of distilled water.

The negative electrode active material of the invention can receive and release a lithium ion. Examples of the negative electrode active materials include a light weight metal, a light weight metal alloy, a carbonaceous, an inorganic oxide, an inorganic chalcogenide, a metal complex, and an organic polymer. These materials can be employed singly or in combination. For instance, a combination of a light weight metal and a carbonaceous material, a combination of a light weight metal and an inorganic oxide, and a combination of a light weight metal, a carbonaceous material and an inorganic oxide can be employed. These negative electrode active materials are preferred because they bring about a high electric capacity, a high discharge electric potential, high safety, and a long life in cyclic use.

The light weight metal preferably is lithium. The light weight metal alloy preferably is an alloy of lithium with other metal. Li-Al, Li-Al-Mn, Li-Al-Mg, Li-Al-Sn, Li-Al-In, and Li-Al-Cd are most preferred.

The carbonaceous material may be natural graphite, synthetic graphite, vapor-deposited carbon, or carbons produced by burning organic materials. Preferred is one having the graphite structure. The carbonaceous material may contain other elements such as B, P, N, S, SiC, $B_4C$ in an amount of up to 10 weight %.

The inorganic oxide or chalcogenide preferably comprises a transition metal or a metal or semimetal which belongs to Groups 13 to 15 of Periodic Table. Examples of the transition metals include V, Ti, Fe, Mn, Co, Ni, Zn, W and Mo. These transition metals can be employed singly or in combination to give a complex oxide or chalcogenide. Particularly preferred is $Li_pCo_qV_{1-q}O_r$ (p=0.1–2.5, q=0–1, z=1.3–4.5) which is described in Japanese Patent Provisional Publication No. H6-44972.

The metal or semimetal other than the transition metal may be an element belonging to Groups 13 to 15 of Periodic Table, for instance, Al, Ga, Si, Sn, Ge, Pb, Sb, or Bi. These element can be employed singly or in combination to give the inorganic metal oxide or chalcogenide. Examples of the preferred inorganic metal oxides or chalcogenides include $Al_2O_3$, $Ga_2O_3$, SiO, $SiO_2$, GeO, $GeO_2$, SnO, $SnO_2$, $SnSiO_3$, PbO, $PbO_2$, $Pb_2O_3$, $Pb_2O_4$, $Pb_3O_4$, $Sb_2O_3$, $Sb_2O_4$, $Sb_2O_5$, $Bi_2O_3$, $Bi_2O_4$, $Bi_2O_5$, $SnSiO_3$, GeS, $GeS_2$, SnS, $SnS_2$, PbS, $PbS_2$, $Sb_2S_3$, $Sb_2S_5$, and $SnSiS_3$. A complex oxide with lithium oxide such as $Le_2$ $GeO_3$ or $Li_2SnO_2$ can also be employed.

The metal oxide for the preparation of the negative electrode active material preferably is amorphous material when it is placed in the container of the final battery product. The term of "amorphous material" in the invention means a material which gives a broad scattered band having its main peak in the range of 20° to 40° (in terms of 2θ) in X-ray diffraction using Cu-K α rays. In the scattered band, a diffraction line may be present. The diffraction line in the range of 40° to 70° (in term of 2θ) preferably has a strength as much as 500 times or less (more preferably as much as 100 times or less, and moreover as much as 5 times or less) than the diffraction line in the range of 20° to 40° (in term of 2θ). Most preferably, there appears no diffraction lines indicating the presence of a crystalline structure.

Preferred are complex metal oxides and chalcoenides comprising a transition metal and an element belonging to Group 13 to 15 of Periodic Table, for instance, B, Al, Ga, In, Tl, Si, Ge, Sn, Pb, P, As and B. Most preferred is the complex metal oxide comprising as principal elements at least two elements selected from the group consisting of B, Al, Si, Ge, Sn and P. The complex oxides and complex chalcoenides can contain an element belonging to Groups 1 to 3 of Periodic Table and/or a halogen atom. A transition metal may be incorporated.

Specifically preferred for the negative electrode active material are amorphous complex oxides comprising tin as the principal element, such as those having one of the following two formulas (1) and (2).

$$SnM^1_aO_t \tag{1}$$

in which M comprises at least two elements selected from the group consisting of Al, B, P, Si, Ge, Pb, Li, Na, K, Rb, Cs, Mg, Ca, Ba, and F; and "a" and "t" are numbers satisfying the conditions of $0.2 \leq a \leq 2$ and $1 \leq t \leq 6$, respectively.

$$Sn_xT_{1-x}M^1_aO_t \tag{2}$$

in which T represents a transition metal such as V, Ti, Fe, Mn, Co, Ni, Zn, W, or Mo; "x" is a number satisfying the condition of $0.1 \leq a \leq 0.9$; and $M^1$, "a" and "t" have the same meanings as above.

Among the complex metal oxides of the formula (1), preferred are those having the following formula (3):

$$SnM^2_bO_t \tag{3}$$

in which $M^2$ comprises at least two elements selected from the group consisting of Al, B, P, Ge, Li, Na, K, Rb, Cs, Mg, Ca, Ba, and F; and "b" and "t" are numbers satisfying the conditions of $0.2 \leq b \leq 2$ and $1 \leq t \leq 6$, respectively.

Among the complex metal oxides of the formula (3), preferred are those having the following formula $$SnM^3_cM^4_dO_t \tag{4}$$

in which $M^3$ is at least one element selected from the group consisting of Al, B, P, Ge; $M^4$ is at least one element selected from the group consisting of Li, Na, K, Rb, Cs, Mg, Ca, Ba, and F; "c" and "d" are numbers satisfying the conditions of $0.2 \leq c \leq 2$, $0.01 \leq d \leq 1$, and $0.2 \leq c+d \leq 2$; and "t" is a number satisfying the condition of $1 \leq t \leq 6$.

The amorphous complex metal oxide preferably employable in the invention can be prepared by a firing method or a solution method. The firing method is preferably adapted. The firing method can be performed by mixing compounds such as oxides of the metals shown in the formula (1) and then by firing the mixture to give the desired amorphous complex oxide.

The firing is preferably performed at a rate of temperature elevation in the range of 5° to 200° C. per minute, and at a temperature in the range of 500° to 1,500° C. The firing is preferably continued for 1 to 100 hours. Further, the rate of temperature lowering preferably is in the range of 2° C. to 10° C. per minute.

The rate of temperature elevation means an average rate of temperature elevation from the level of 50% of the firing temperature (in term of °C.) to the level of 80% of the firing temperature. The rate of temperature lowering means an average rate of temperature lowering from the level of 80% of the firing temperature (in term of °C) to the level of 50% of the firing temperature.

The temperature lowering can be made by allowing the fired product to stand in the furnace employed or by introducing the fired product into water. Also employable are various known ultra-rapid cooling methods such as Gun method, Hammer-Anvil method, Slap method, Gas atomizing method, Plasma spray method, Centrifugal rapid cooling method, and Melt drag method, which are described in "Ceramics Processing" (published by Gihodo Publishing Company Ltd., 1987). The single roller method or double roller method described in "New Glass Handbook" (published by Maruzen Co., Ltd., 1991) can be employed for the rapid cooling. If the mixed material melts in the firing procedure, the mixed material can be continuously fed into the firing furnace while the firing takes place, and the fired product can be continuously taken out from the furnace. In such material, a fusing agent is preferably incorporated.

The firing is preferably performed in a gaseous atmosphere containing no or at most 5 vol. % of oxygen. Preferred is an inert gas atmosphere. Examples of the inert gas include nitrogen, argon, helium, krypton, and xenon. Most preferred inert gas is pure argon.

The negative electrode active material is preferably employed in the form of particles. There is no specific limitation with respect to the size of the particles, but the particle size preferably is in the range of 0.1 to 60 μm. More preferably, the particle size is in the range of 0.7 to 30 μm, and more than 60 vol. % of the particles have a size in the range of 0.5 to 30 μm. Among such particles, most preferred are as follows: particles having a size of less than 1 μm is 30 vol.% (based on the total volumes of the whole particles) or less, and particles having a size of 20 μm or more do not exceed 25 vol. % (based on the total volumes of the whole particles). Needless to say, the particle size should not exceed the thickness of the negative electrode layer.

The control of the particle size can be performed by means of a known pulverizer or sieving apparatus. For instance, a mortar, a ball mill, a sand mill, a vibrating ball mill, a satellite ball mill, a planetary ball mill, a stream circulating jet mill, or a sieve can be employed. The pulverization may be performed in a wet process in the presence of water or an organic solvent such as methanol, if necessary. Sieving is preferably carried out for obtaining particles of the desired size. The sieving can be done by any methods such as those using a sieve or a blowing sieving apparatus. The sieving can be done in a dry process or a wet process.

In the specification, the average particle size means a Median diameter of the primary particles and can be measured using an apparatus for measuring particle size distribution by laser diffraction.

Examples of the negative electrode active materials include the following compounds:
$SnAl_{0.4}B_{0.5}P_{0.5}K_{0.1}O_{3.65}$, $SnAl_{0.4}B_{0.5}P_{0.5}Na_{0.2}O_{3.7}$, $SnAl_{0.4}B_{0.3}P_{0.5}Rb_{0.2}O_{3.4}$, $SnAl_{0.4}B_{0.5}P_{0.5}Cs_{0.1}O_{3.65}$, $SnAl_{0.4}B_{0.5}P_{0.5}K_{0.1}Ge_{0.05}O_{3.85}$, $AnAl_{0.4}B_{0.5}P_{0.5}K_{0.1}Mg_{0.1}Ge_{0.02}O_{3.83}$, $SnAl_{0.4}B_{0.4}P_{0.4}O_{3.2}$, $SnAl_{0.3}B_{0.5}P_{0.2}O_{2.7}$, $SnAl_{0.3}B_{0.5}P_{0.2}O_{2.7}$, $SnAl_{0.4}B_{0.5}P_{0.3}Ba_{0.08}Mg_{0/08}O_{3.26}$, $SnAl_{0.4}B_{0.4}P_{0.4}Ba_{0.08}O_{3.28}$, $SnAl_{0.4}B_{0.5}P_{0.5}O_{3.6}$, $SnAl_{0.4}B_{0.5}P_{0.5}Mg_{0.1}O_{3.7}$, $SnAl_{0.5}B_{0.4}P_{0.5}Mg_{0.1}F_{0.2}O_{3.65}$, $SnB_{0.5}P_{0.5}Li_{0.1}Mg_{0.1}F_{0.2}O_{3.05}$, $SnB_{0.5}P_{0.5}K_{0.1}Mg_{0.1}F_{0.2}O_{3.05}$, $SnB_{0.5}P_{0.5}K_{0.05}Mg_{0.05}F_{0.1}O_{3.03}$, $SnB_{0.5}P_{0.5}K_{0.05}Mg_{0.1}F_{0.2}O_{3.03}$, $SnAl_{0.4}B_{0.5}P_{0.5}Cs_{0.1}Mg_{0.1}F_{0.2}O_{3.65}$, $SnB_{0.5}P_{0.5}Cs_{0.05}Mg_{0.05}F_{0.1}O_{3.03}$, $SnB_{0.5}P_{0.5}Mg_{0.1}F_{0.1}O_{3.05}$, $SnB_{0.5}P_{0.5}Mg_{0.1}F_{0.2}O_{3}$, $SnB_{0.5}P_{0.5}Mg_{0.1}F_{0.06}O_{3.07}$, $SnB_{0.5}P_{0.5}Mg_{0.1}F_{0.14}O_{3.03}$, $SnPBa_{0.08}O_{3.58}$, $SnPK_{0.1}O_{3.55}$, $SnPK_{0.05}Mg_{0.05}O_{3.58}$, $SnPCs_{0.1}O_{3.55}$, $SnPBa_{0.08}F_{0.08}O_{3.54}$, $SnPK_{0.1}Mg_{0.1}F_{0.2}O_{3.55}$, $SnPK_{0.05}Mg_{0.05}F_{0.1}O_{3.53}$, $SnPCs_{0.1}Mg_{0.1}F_{0.2}O_{3.55}$, $SnPCs_{0.05}Mg_{0.05}F_{0.1}O_{3.53}$, $Sn_{1.1}Al_{0.4}B_{0.2}P_{0.6}Ba_{0.08}F_{0.08}O_{3.54}$, $Sn_{1.1}Al_{0.4}B_{0.2}P_{0.6}Li_{0.1}K_{0.1}Ba_{0.1}F_{0.1}O_{3.65}$, $Sn_{1.1}Al_{0.4}B_{0.4}P_{0.4}Ba_{0.08}O_{3.34}$, $Sn_{1.1}Al_{0.4}PCs_{0.05}O_{4.23}$, $Sn_{1.1}Al_{0.4}PK_{0.05}O_{4.23}$, $Sn_{1.2}Al_{0.5}B_{0.3}P_{0.4}Cs_{0.2}O_{3.5}$, $Sn_{1.2}Al_{0.4}B_{0.2}P_{0.6}Ba_{0.08}O_{3.68}$, $Sn_{1.2}Al_{0.4}B_{0.2}P_{0.6}Ba_{0.08}F_{0.08}O_{3.64}$, $Sn_{1.2}Al_{0.4}B_{0.2}P_{0.6}Mg_{0.04}Ba_{0.04}O_{3.68}$, $Sn_{12}Al_{0.4}B_{0.3}P_{0.5}Ba_{0.8}O_{3.58}$, $Sn_{1.3}Al_{0.3}B_{0.3}P_{0.4}Na_{0.2}O_{3.3}$, $Sn_{1.3}Al_{0.2}Ba_{0.4}P_{0.4}Ca_{0.2}O_{3.4}$, $Sn_{1.3}Al_{0.4}B_{0.4}P_{0.4}Ba_{0.2}O_{3.6}$, $Sn_{1.4}Al_{0.4}PK_{0.2}O_{4.6}$, $Sn_{1.4}Al_{0.2}Ba_{0.1}PK_{0.2}O_{4.45}$, $Sn_{1.4}Al_{0.2}Ba_{0.2}PK_{0.2}O_{4.6}$, $Sn_{1.4}Al_{0.4}Ba_{0.2}PK_{0.2}Ba_{0.1}Fe_{0.2}O_{4.9}$, $Sn_{1.4}Al_{0.4}PK_{0.3}O_{4.65}$, $Sn_{1.5}Al_{0.2}PK_{0.2}O_{4.4}$, $Sn_{1.5}Al_{0.4}PK_{0.1}O_{4.65}$, $Sn_{1.5}Al_{0.4}PCs_{0.05}O_{4.63}$, $Sn_{1.5}Al_{0.4}PCs_{0.05}Mg_{0.1}F_{0.2}O_{4.63}$, $SnSi_{0.5}Al_{0.1}B_{0.2}P_{0.1}Ca_{0.4}O_{3.1}$, $SnSi_{0.4}Al_{0.2}B_{0.4}O_{2.7}$, $SnSi_{0.5}Al_{0.2}B_{0.1}P_{0.1}Mg_{0.1}O_{2.8}$, $SnSi_{0.6}Al_{0.2pl}B_{0.2}O_{2.8}$, $SnSi_{0.5}Al_{0.3}B_{0.4}P_{0.2}O_{3.55}$, $SnSi_{0.5}Al_{0.3}B_{0.4}P_{0.5}O_{4.30}$, $SnSi_{0.6}Al_{0.1}B_{0.1}P_{0.3}O_{3.25}$, $SnSi_{0.6}Al_{0.1}B_{0.1}P_{0.1}Ba_{0.2}O_{2.95}$, $SnSi_{0.6}Al_{0.1}B_{0.1}P_{0.1}Ca_{0.2}O_{2.95}$, $SnSi_{0.6}Al_{0.4}B_{0.2}Mg_{0.1}O_{3.2}$, $SnSi_{0.6}Al_{0.1}B_{0.3}P_{0.1}O_{3.05}$, $SnSi_{0.6}Al_{0.2}Mg_{0.2}O_{2.7}$, $SnSi_{0.6}Al_{0.2}Ca_{0.2}O_{2.7}$, $SnSi_{0.6}Al_{0.2}P_{0.2}O_{3}$, $SnSi_{0.6}B_{0.2}P_{0.2}O_{3}$, $SnSi_{0.8}Al_{0.2}O_{2.9}$, $SnSi_{0.8}Al_{0.3}B_{0.2}P_{0.2}O_{3.85}$, $SnSi_{0.8}B_{0.2}O_{2.9}$, $SnSi_{0.8}Ba_{0.2}O_{2.8}$, $SnSi_{0.8}Mg_{0.2}O_{2.8}$, $SnSi_{0.8}Ca_{0.2}O_{2.8}$, $SnSi_{0.8}P_{0.2}O_{3.1}$, $Sn_{0.9}Mn_{0.3}B_{0.4}P_{0.4}Ca_{0.1}Rb_{0.1}O_{2.95}$, $Sn_{0.9}Fe_{0.3}B_{0.4}P_{0.4}Ca_{0.1}Rb_{0.1}O_{2.98}$, $Sn_{0.8}Pb_{0.2}Ca_{0.1}P_{0.7}O_{3.35}$, $Sn_{0.3}Ge_{0.7}Ba_{0.1}P_{0.9}O_{3.35}$, $Sn_{0.9}Mn_{0.1}Mg_{0.1}P_{0.9}O_{3.35}$, $Sn_{0.2}Mn_{0.8}Mg_{0.1}P_{0.9}O_{3.35}$, $Sn_{0.7}Pb_{0.3}Ca_{0.1}P_{0.9}O_{3.35}$, and $Sn_{0.2}Ge_{0.8}Ba_{0.1}P_{0.9}O_{3.35}$.

The chemical formula of the above-mentioned fired product can be determined experimentally by an inductive combination plasma (ICP) emission spectroscopy, or simply by comparing the weight of the starting materials and the weight of the fired product.

The amount of lithium ion to be intercalated into the negative electrode is determined to nearly reach the deposition potential of lithium. For instance, 50 to 700 molar % of lithium ion is intercalated into the negative electrode. An amount of 100 to 600 molar % is more preferred. The amount of lithium ion to be released from the negative electrode is preferred to be as much as possible, as compared with the amount of lithium ion intercalated into the negative electrode the intercalation is preferably performed by electrochemical process, a chemical process, or a the process. The electrochemical process is preferably conducted by transferring a lithium ion from the positive electrode active material to the negative electrode. Also employable is an electrochemical process comprising direct transfer from a lithium metal or its alloy to the negative electrode. The chemical process can be conducted by blending with or bringing the negative electrode active material into contact with an organic metal compound such as butyllithium. The electrochemical and chemical processes are preferably adopted.

The negative electrode may further contain one or more of various dopants such as lanthanoids (e.g., Hf, Ta, W, Re, Os, Ir, Pt, Au, and H) and electroconductive compounds such as compounds of Sb, In, and Nb. The amount of the dopant preferably is less than 5 molar %.

The metal oxide for the positive electrode active material or the negative electrode active material can be coated on its surface with a metal oxide having a chemical formula differing from that of the active material to be coated. The metal oxide for the surface coating is preferably soluble either in an acidic medium or in an alkaline medium. The oxide is furthermore preferred to have a high electroconductivity. For instance, $SiO_2$, $PbO_2$, $Fe_2O_3$, $SnO_2$, $In_2O_3$, and $ZnO$ are preferred. These metal oxides preferably contain a dopant such as a metal having a different valency or a halogen atom. Particularly preferred are $SiO_2$, $PbO_2$, $Fe_2O_3$, $SnO_2$, and $ZnO$. The metal oxide for the surface coating is preferably in an amount of 0.1 to 10 wt. %, more preferably 0.2 to 5 wt. %, most preferably 0.3 to 3 wt. %, based on the amount of the positive or negative electrode active material.

The surface of the positive electrode active material can be modified. For instance, the surface of the metal oxide is treated with anesterifying agent or a chelating agent or coated with anelectroconductive polymer or polyethylene oxide. The surface of the negative electrode active material can be also modified, for instance, by coating its surface with an ion conductive polymer or a polyacetylene layer. Such coating or modification can be performed after the positive or negative electrode active material is purified, for instance, by washing with water.

The electrode mixture can be processed to give pellets. In the manufacture of the secondary battery of cylinder, coin or square, the electrode mixture is coated on the collector, dehydrated, dried, and pressed to give an electrode sheet.

Each of the positive electrode sheet and the negative electrode sheet can be prepared by coating a mixture which comprises, for example, an electrode active material, an electroconductive material, a binder, a filler, a disperser, an ion-conductive material and a pressure regulator, on a collector. The mixture is generally called "electrode mixture". The mixture is coated on the collector in the form of a solution and then dried.

Examples of the electroconductive materials are electroconductive materials which are chemically stable in the battery and include naturally produced graphite such as flake graphite, massive graphite, synthetic graphite, carbon black, acetylene black, ketchen black, carbonaceous fibers, powder of metal (e.g., copper, nickel, aluminum, or silver), metal fibers, and polyphenylene derivatives. These materials can be employed singly or in combination. Particularly preferred is a combination of graphite and acetylene black. The amount of the electroconductive material incorporated into the electrode material is generally not more than 50 wt. %, preferably 1 to 50 wt. %, more preferably 2 to 30 wt. %. When carbon or graphite is employed, its amount preferably is in the range of 2 to 15 wt. %.

Examples of the binders include polysaccharides, thermoplastic resins, and elastic polymers, such as starch, polyvinyl alcohol, carboxymethyl cellulose, hydroxypropylcellulose, regenerated cellulose, diacetyl cellulose, polyvinyl chloride, polyvinyl pyrrolidone, tetrafluoroethylene, poly fluorinated vinylidene, polyethylene, polypropylene, ethylene-propoylene-diene terpolymer (EPDM), sulfonated EPDM, styrene-butadine rubber, polybutadine, fluorinated rubber, and polyethylene oxide. These materials can be employed singly or in combination. There is no specific limitation with respect to the amount of the binder, but it preferably is in the range of 1 to 50 wt. %, more preferably 2 to 30 wt. %. The binder is generally incorporated uniformly in the electrode layer, but it can be incorporated locally in the electrode layer.

In the invention, a binder having a decomposition temperature over 300° C. is preferably employed. Examples of such heat-resistant binders include polyetheylene, polypropylene, polytetrafluoroethylene (PTFE), polyvinylidene fluoride (PVDF), tetrafluoroethylene-hexafluoropropylene copolymer (FEP), tetrafluoroethylene-perfluoroalkyl vinyl ether copolymer (PFA), vinylidene fluoride-hexafluoropropylene copolymer, vinylidene fluoride-chlorotrifluoroethylene copolymer, ethylene-tetrafluoroethylene copolymer (ETFE), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene copolymer, and vinylidene fluoride-perfluoromethyl vinyl ether-tetrafluoroethylene copolymer.

Examples of the fillers are any fibrous materials which are chemically stable in the battery and include fibers of olefin polymers such as polypropylene and polyethylene, glass material and carbonaceous materials. The filer can be included in an amount of not more than 30 wt. %.

The ion-conductive material can be a known inorganic or organic solid electrolyte. Details of the solid electrolyte shall be described hereinafter with respect to the electrolytic solution. The pressure regulator serves to increase the inner pressure of the battery, and is represented by carbonates. Details of the pressure regulator shall be described also hereinafter.

The collector comprises an electro-conductive material which is chemically stable in the battery. Examples of the collectors for positive electrode include sheets of stainless steel, nickel, aluminum, titanium, fired carbon, and sheet of aluminum or stainless steel which is plated with carbon, nickel, titanium or silver. Examples of the collectors for negative electrode include sheets of stainless steel, nickel, copper, titanium, aluminum, fired carbon, sheet of copper or stainless steel which is plated with carbon, nickel, titanium or silver, and Al-Cd alloy. The collectors can be oxidized on their surfaces. The collectors can be made in various forms such as sheet, foil, film, net, punched sheet, porous body and sheet, and combined fibers (fibrous mass). The thickness of the collector generally is in the range of 1 to 500 μm, preferably 5 to 100 μm.

Each of the electrode mixtures comprising the positive and negative electrode active materials is coated on the collector for preparing a positive or negative electrode layer, respectively. The collector can be coated with a subbing layer before the electrode mixture is coated. The subbing layer can be for increasing the binding between the collector and the electrode layer, or for improving electroconductivity. A protective layer also can be formed on the coated electrode layer to keep the electrode layer from mechanical or chemical damage. The subbing layer and protective layer can comprise a binder, an electroconductive powder, or a non-electroconductive powder.

The electrode mixture can be coated, dried and compressed under pressure on the collector to form the desired electrode layer. The coating can be done by any known methods. Examples of the known coating methods include reverse roller method, direct roller method, blade method, knife method, extrusion method, curtain method, gravure method, bar method, dip method, and squeeze method. The coating method can be determined in consideration of the nature and characteristics of the coating solution of the electrode mixture. The blade method, knife method, and extrusion method are preferably employed. The coating is preferably done at a rate of 0.1 to 100 m/min. The electrode mixture is coated one surface or both surfaces of the collector. If the both surfaces are coated, the coating can be done simultaneously or one after another. The electrode mixture can be coated on the collector continuously or intermittently. The coating can be made in the form of stripes. The thickness, length, and width of the coated layer can be determined in consideration of the size of the battery into which the electrode sheet is incorporated. The thickness of the one coated layer preferably is in the range of 1 to 2,000 μm (thickness after being compressed).

The ratio of the width of the positive electrode sheet to that of the negative electrode sheet preferably is in the range of 0.9 to 1.1, more preferably 0.95 to 1.1. The amounts of the positive electrode active material and the negative electrode active materials can be adjusted to optimum values, from the viewpoints of the desired electric capacity, cycle life, and safety.

The drying (or dehydration) of the coated layer can be done by any known methods. For instance, the drying can be done using hot air, vacuum, infrared rays, ultra infrared rays, electron beam, and air of low humidity, singly or in combination. The drying temperature preferably in the range of 80° to 350° C., more preferably 100° to 250° C. The electrode layer preferably contains water in an amount as low as possible for prolonging the cycle life of the battery, and the water content of each electrode layer preferably is less than 500 ppm, so that the total water content in the battery cannot exceed 2,000 ppm.

The compressing of the electrode layer can be performed by any known methods. Preferred methods are a dye press method and a calendar-press method. The pressure can preferably be 0.2 to 3 t/cm$^2$, and when the calendar-press method is employed, the rate of pressing preferably is in the range of 0.1 to 50 m/min. The pressing temperature preferably is between room temperature and 200° C.

The lithium ion secondary battery of the invention can be manufactured in the conventional way using the materials described above. In the manufacturing the secondary battery, other materials and elements can be further incorporated together with the electrode materials and the electrolytic solution.

The lithium ion secondary battery of the invention can be manufactured to give secondary batteries in various types such as cylinder, coin, button, sheet, and square.

Figure 1:
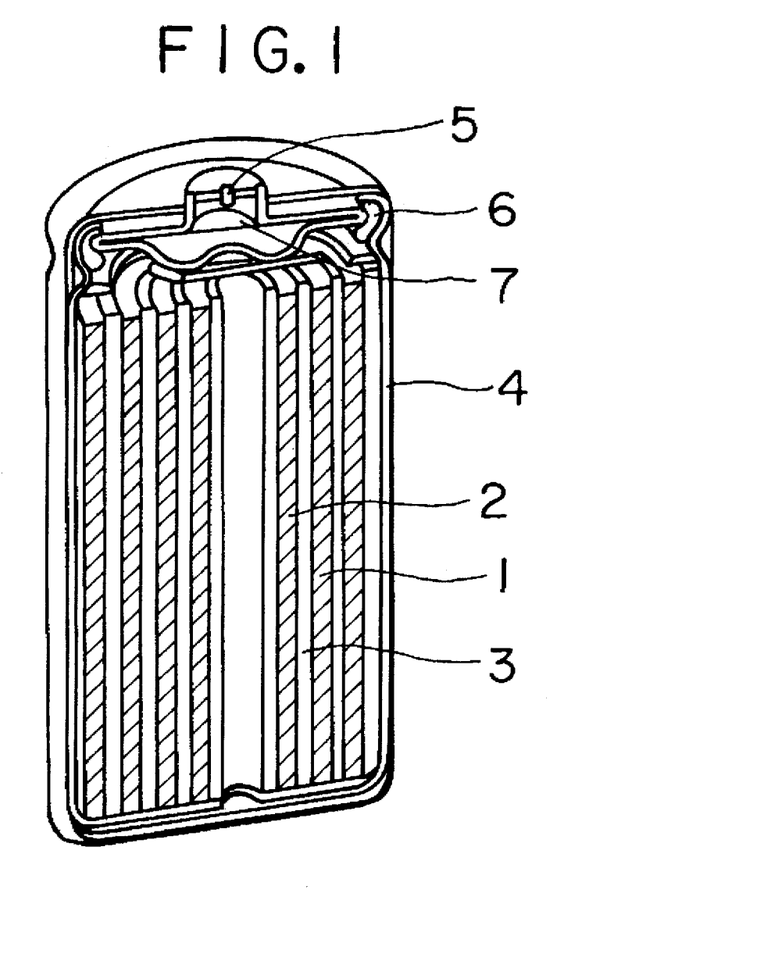
FIG. 1 is a schematic section of a representative structure of a non-aqueous lithium ion secondary battery.

In FIG. 1 of the attached drawing, a lithium ion secondary battery of a representative cylinder type is illustrated, in which a positive electrode sheet 1 and a negative electrode sheet 2 are wound together spirally with a separator 3 intervening between the sheet 1 and the sheet 2. They are encased in a container (i.e., battery can) 4 in which an electrolytic solution is placed. On the top of the container 4, a battery cap 5 is fixed by means of a gasket 6. The battery cap 5 is equipped with a safety valve 7. The safety valve can be equipped with a known safety-assuring element. For instance, fuse, bimetal or PTC element can be employed for preventing over current. The container can be provided with a slit to cope with increase of the inner pressure. The increase of the inner pressure can be prevented by rendering the gasket, a sealing plate, or a lead plate easily breakable. The over-current can be prevented by providing an over-charge preventing means or an over-discharge preventing means. These preventing means may be provided independently and connected to the battery via a circuit. The over-current can be shut-down by increasing the inner pressure of the battery can. Such increase of the inner pressure can be produced by incorporating an inner pressure-increasing material into the electrode mixture or the electrolytic solution. Examples of the inner pressure-increasing material include carbonates such as $Li_2CO_3$, $LiHCO_3$, $Na_2CO_3$, $NaHCO_3$, $CaCO_3$, and $MgCO_3$.

The battery can (i.e., container) and a lead plate can be made of a metal or alloy having an electroconductivity. For instance, metals such as iron, nickel, titanium, chromium, molybdenum, copper and aluminum, and their alloys can be used. The cap, can, sheets, and lead plates can be welded to fix to each other by a known method such as a direct or alternating current welder, a laser welder, or a ultrasonic welder. The sealing can be done using a known compound or mixture such as asphalt.

The electrolytic solution comprises a non-protonic organic solvent and a lithium salt (that is, electrolyte) soluble in the solvent. Examples of the organic solvents include propylene carbonate, ethylene carbonate, butylene carbonate, dimethyl carbonate, diethyl carbonate, methyl ethyl carbonate, γ-butylolactone, methyl formate, methyl acetate, 1,2-dimethoxyethane, tetrahydrofuran, 2-methyltetrahydrofuran, dimethyl sulfoxide, 1,3-dioxolane, formamide, dimethyl formamide, dioxolane, acetonitrile, nitromethane, ethyl monolyme, phosphoric triester, trimethoxymethane, dioxolane derivatives, sulforane, 3-methyl-2-oxazolidinone, propylene carbonate derivatives, tetrahydrofuran derivatives, diethyl ether, and 1,3-propane sultone. These solvents can be employed singly or in combination. Preferred are cyclic carbonates and non-cyclic carbonates, for instance, ethylene carbonate, propylene carbonate, diethyl carbonate, dimethyl carbonate, and methylethyl carbonate.

Examples of the lithium salts include $LiClO_4$, $LiBF_4$, $LiPF_6$, $LiCF_3SO_3$, $LiCF_3CO_2$, $LiASF_6$, $LiSbF_6$, $Li(CF_3SO_2)_2N$, $LiB_{10}Cl_{10}$, lithium salts of lower aliphatic carboxylic acids, $LiAlCl_4$, LiCl, LiBr, LiI, chloroborane lithium, and lithium tetraphenylborate. These lithium salts can be employed singly or in combination.

Preferred is an electrolytic solution of $LiCF_3SO_3$, $LiClO_4$, $LiBF_4$ and $LiPF_6$ in a mixture of propylene carbonate or ethylene carbonate with 1,2-dimethoxyethane and/or diethyl carbonate. In the mixture, propylene carbonate or ethylene carbonate is mixed with 1,2-dimethoxyethane and/or diethyl carbonate preferably in the ratio of 0.4/0.6 to 0.6/0.4. 1,2-Dimethoxyethane and diethyl carbonate are preferably mixed in the ratio of 0.4/0.6 to 0.6/0.4. The concentration of the electrolyte preferably is in the range of 0.2 to 3 moles per one liter of the electrolytic solution.

The electrolytic solution can contain ore or more inorganic solid electrolytes. Examples of the inorganic electrolytes include nitrides, halide, and oxygen containing compounds of lithium. These examples are $Li_3N$, LiI, $Li_5NI_2$, $Li_3N$-LiI-LiOH, $Li_4SiO_4$, $Li_4SiO_4$-LiI-LiOH, $xLi_3PO_4$-(1-x)$Li_4SiO_4$, $Si_2SiS_3$, and phosphorous sulfide.

The electrolytic solution can contain one or more organic solid electrolytes. Examples of the employable organic solid electrolyte include polyethylene oxide derivatives, polymers having polyethylene oxide unit, polypropylene oxide derivatives, polymers having polypropylene oxide unit, polymers having ion releasable group, a mixture of a polymer having ion releasable group and the aforementioned non-protonic electrolyte, and phosphoric ester polymers. The electrolytic solution may contain polyacrylonitrile. The inorganic solid electrollte and organic solid electrolite can be employed in combination.

The electrolite is preferably employed at a concentration of 0.2 to 3 moles per one liter of the electrolytic solution.

The electrolytic solution can further contain one or more materials mentioned below, for improving charge-discharge characteristics: pyridine, triethyl phosphite, triethanolamine, cyclic ethers, ethylene diamine, n-glyme, triamide hexaphosphate, nitrobenzene derivatives, sulfur, quinoneimine dyes, N-substituted oxazolidinone, N, N'- substituted imidazolidinone, ethylene glycol dialkyl ether, quaternary ammonium salts, polyethylene glycol, pyrrole, 2-methoxyethanol, aluminum trichloride, electroconductive polymer, monomers of electrolide active materials, triethylene phosphoneamide, trialkylphosphine, morpholine, aryl compounds having carbonyl group, hexamethylphosphoric triamide, 4-alkylmorpholine, bicyclic tertiary amines, oils, quaternary phosphonium salts, and tertiary sulphonium salts.

A halogen-containing solvents such as carbon tetrachloride or trifluorinated chlorinated ethylene can be incorporated into the electrolytic solution so as to render the battery incombustible. Carbon dioxide gas may be incorporated into the electrolytic solution to improve the battery in its resistance in high temperature storage.

The electrolytic solution or electrolytic material can be incorporated into the electrode mixture. For instance, the above-mentioned ion-conductive polymer, nitromethane, and/or an electrolytic solution can be incorporated into the electrode mixture.

The separator is a micro-porous electro-insulating thin film which has a high ionic permeation rate and an appropriate physical strength. The separator preferably closes its pores at a temperature of 80° C. or higher and disturbs the permeation of lithium ions. For instance, a sheet or non-woven sheet made of an olefinic polymer such as polypropylene and polyethylene, or glass fiber can be employed. The pore sizes of the separator generally is in the range of 0.01 to 10 µm. The thickness of the separator generally is in the range of 5 to 300 µm. The separator can be prepared from an appropriate polymer by a dry stretching process or a wet de-solvent process.

The lithium ion secondary battery (i.e., non-aqueous lithium ion secondary battery) Of the invention can be utilized in various products and devices. Examples are handy personal computers (color or monochromatic), personal computers for imputing with pen, palm-top personal computers, note-type word processers, handy word processors, players for electronically playable book, handy phones, cordless phones ( separated phones), pagers, handy terminals, handy facsimiles, handy copying machines, handy printers, head-phone stereos, video movies, liquid crystal television sets, handy cleaners, potable CD players, mini-disk players, electric shavers, electronic interpreters, phones for automobiles, transceivers, electrically actuatable tools, electronic pocket notes, electronic calculators, memory cards, tape recorders, radio sets, and back-up electric sources. The secondary battery is also employable for motor cars, electric cars, motors, illuminating devices, toys, machines for amusement game, road conditioners, iron devices, watches, strobes, cameras, medical equipments (pace makers, hearing aids, massaging devices). The secondary battery is further employ-able in the fields of space technology and military area. The secondary battery can be employed in combination with other electric sources such as Solar battery.

The particularly preferred embodiments of the non-aqueous lithium ion secondary battery are described below.

1) Positive electrode sheet

Positive electrode active material: a combination of $LiXCoO_2$ and $LixMn_2O_4$ ($0 \leq x \leq 1$)

Electroconductive material: acetylene black, or graphite

Binder: fluorine atom-containing thermoplastic polymer such as polyvinylidene fluoride or polyfluoroethylene, polymer containing acrylic acid mits, elastomer such as styrene butadiene rubber, or ethylene propylene terpolymer, singly or in combination Collector: net, sheet, foil, or non-woven material of stainless steel or aluminum 2) Negative electrode sheet Negative electrode active material: lithium metal, lithium alloy (e.g., Li-Al), carbonaceous material, metal oxides (e.g., $LiCoVo_4$, $SnO_2$, $SnO$, $SiO$, $GeO_2$, $GeO$, $SnSiO_3$, and $SnSi_{0.3}Al_{0.1}B_{0.2}P_{0.3}O_{3.2}$), sulfides (e.g., $TiS_2$, $SnS_2$, $SnS$, $GeS_2$, and $GeS$)

Electroconductive material: acetylene black, or graphite

Binder: fluorine atom-containing thermoplastic polymer such as polyvinylidene fluoride or polyfluoroethylene, polymer containing acrylic acid mits, elastomer such as styrene butadiene rubber, or ethylene propylene terpolymer, singly or in combination Collector: net, sheet, foil, or non-woven material of stainless steel or copper 3) Electrolytic solution Solvent: cyclic or non-cyclic carbonate such as ethylene carbonate, diethyl carbonate, or dimethyl carbonate, or ester such as ethyl acetate Supporting electrolyte: $LiPF_6$, and preferably in addition, such a lithium salt as $LiBF_4$ or $LiCF_3SO_3$.

4) Separator

Separator made of polypropylene, polyethylene, or their combination

5) Type of battery cylinder, flat, or cubic, preferably equipped with a safety-assuring means such as an inner pressure-relieving safety valve, a current shot-down safety valve, or a separator showing a high resistance at an elevated temperature.

The present invention is further described in the following non-limitative examples.

EXAMPLE (1) Negative electrode sheet

Eighty six (86) weight parts of a negative electrode active material ($SnB_{0.2}P_{0.5}K_{0.1}Mg_{0.1}Ge_{0.1}O_{2.8}$) and 9 weight parts of electroconductive materials (3 weight parts of acetylene black and 6 weight parts of graphite) were mixed. Thus obtained mixture was mixed with 5 weight parts of a binder (4 weight parts of polyvinylidene fluoride and 1 weight part of carboxymethylcellulose), and then incorporated into water to give an aqueous slurry after kneading. The slurry was coated on both surfaces of a copper foil of 10 µm thick using an extrusion coater. The coated foil was compressed by a calendar press to give a negative electrode sheet in the form of a belt. The coated negative electrode active material amount to 70 g/m².

(2) Positive electrode sheet

1) Electrode mixture A: Eighty seven (87) weight parts of a positive electrode active material ($LiCoO_2$), and 9 weight parts of electroconductive materials (3 weight parts of acetylene black and 6 weight parts of graphite) were mixed. Thus obtained mixture was mixed with 4 weight parts of a binder (3 weight parts of Nipol 820B, available from Nihon Geon Co., Ltd., and 1 weight part of carboxymethylcellulose), and then incorporated into water to give an aqueous slurry after kneading. Thus obtained slurry was named Electrode mixture A.

2) Electrode mixture B: Eighty seven (87) weight parts of a positive electrode active material ($LiMn_2O_4$), and 9 weight parts of electroconductive materials (3 weight parts of acetylene black and 6 weight parts of graphite) were mixed. Thus obtained mixture was mixed with 4 weight parts of a binder (3 weight parts of Nipol 820B, available from Nihon Geon Co., Ltd., and 1 weight part of carboxymethylcellulose), and then incorporated into water to give an aqueous slurry after kneading. Thus obtained slurry was named Electrode mixture B.

3) Electrode mixture C: Eighty seven (87) parts of positive electrode active materials (43.5 weight parts of $LiCoO_2$ and 43.5 weight parts of $LiMn_2O_4$), and 9 weight parts of electroconductive materials (3 weight parts of acetylene black and 6 weight parts of graphite) were mixed. Thus obtained mixture was mixed with 4 weight parts of a binder (3 weight parts of Nipol 820B, available from Nihon Geon Co., Ltd., and 1 weight part of carboxymethylcellulose), and then incorporated into water to give an aqueous slurry after kneading. Thus obtained slurry was named Electrode mixture C.

4) Positive electrode sheet: On both surfaces of an aluminum foil of 20 µm thick, Electrode mixtures A and B are simultaneously coated in the manner as set forth in Table 1. The coated layers were dried, and compressed by means Of a calendar press to give a positive electrode sheet in the form of a belt. The coated positive electrode active materials amounted to 350 g/m². In Table 1, the first layer is the underlayer next to the collector. The ratio of coated materials is expressed in terms of weight ratio.

(3) Preparation of Battery

To the end of each of the negative electrode sheet and the positive electrode sheet was welded a lead plate of nickel and that of aluminum, respectively. Both were heated in a dry air for one hour at a temperature of 230° C. and a dew point of lower than −40° C. The heating was carried out using a far infrared ray heater. The heated positive electrode sheet, a separator made of a micro-porous laminate of polyethylene/polypropylene, the heated negative electrode sheet, and a separator of the same type were laminated in order and spirally wound. The wound laminate was encased in a cylinder can which had a bottom plate and was made of nickel-plated iron sheet. The cylinder can served as a terminal for negative electrode. In the cylinder can was placed 1 mol/liter of $LiPF_6$ in a mixture of ethylene carbonate and diethyl carbonate (2:8, by weight). Onto the top of the cylinder can, a battery cap having a terminal for positive electrode was caulked via a gasket. The terminal for electrode and the positive electrode sheet, as well as the battery can and the negative electrode sheet were both connected using lead terminals, respectively. A safety valve was equipped. Thus, there was prepared a non-aqueous lithium ion secondary batter of cylinder type, as illustrated in FIG. 1.

For each constitution set forth in Table 1, 100 sets of the same batteries were prepared. All of the prepared batteries were charged at room temperature to give a voltage of 4.2 V using a current of 1 mA/cm$^2$. The charge batteries were discharged down to 2.8 V. This charge-discharge cycle was repeated three times, and thereafter the batteries were charged and stored at 60° C. for one month. The batteries were then checked to count number of damaged batteries, i.e., batteries showing leakage of the electrolytic solution.

Independently, the battery of each constitution was charged to a voltage of 4.2 V using a current at 5 mA/cm$^2$, and then discharged to a voltage of 2.8 V. This charge-discharge cycle was repeated to evaluate the charge-discharge characteristics of the battery. The charge-discharge characteristics were expressed in terms of number of cycles to reach the discharge capacity of 80% based on the initial discharge capacity which was determined in the first cycle. The results are set forth in Table 1.

TABLE 1

| Battery Sample No. | Positive electrode layers | | | Weight ratio | Number of Damaged | Initial capacity (WH) | Cycle characteristics |
|---|---|---|---|---|---|---|---|
| | First | Second | Third | | | | |
| 1 | B | A | none | 20/80/0 | 0 | 5.44 | 402 |
| 2 | B | A | B | 10/80/10 | 0 | 5.41 | 403 |
| 3 | A | B | none | 40/60/0 | 0 | 5.15 | 389 |
| 4 | A | B | A | 30/60/10 | 0 | 5.09 | 395 |
| 5 | B | A | none | 50/50/0 | 0 | 4.96 | 373 |
| 6 | A | B | none | 25/75/0 | 0 | 4.85 | 381 |
| 7 | B | A | B | 20/60/20 | 0 | 5.27 | 399 |
| 8 | A | B | A | 5/70/25 | 0 | 4.91 | 358 |
| 9 | A | none | none | 100/0/0 | 4 | 5.46 | 257 |
| 10 | B | none | none | 100/0/0 | 0 | 4.54 | 298 |
| 11 | C | none | none | 100/0/0 | 2 | 4.40 | 312 |

What is claimed is:

1. A non-aqueous lithium ion secondary battery comprising a positive electrode sheet which comprises a lithium-containing transition metal oxide film, a negative electrode sheet which has a film of material capable of receiving and releasing a lithium ion, a non-aqueous electrolyte which contains a lithium salt, and a container which seals the electrodes and electrolyte therein, wherein the lithium-containing transition metal oxide film comprises at least two layers, one of which expands during discharging while shrinks during charging, and another of which shrinks during discharging while expands during charging.

2. The non-aqueous lithium ion secondary battery of claim 1, wherein one of the two layers comprises a lithium-containing manganese oxide of a spinel structure, while another comprises a lithium-containing cobalt oxide.

3. The non-aqueous lithium ion secondary battery of claim 1, wherein one of the two layers comprises a lithium-containing manganese oxide of a spinel structure which is represented by $Li_{2-x}Mn_2O_4$ wherein x is a number satisfying the condition of $0 \leq x \leq 1$, while another comprises a lithium-containing cobalt oxide represented by $Li_{1-y}CoO_2$ wherein y is a number satisfying the condition of $0 \leq y \leq 1$.

4. The non-aqueous lithium ion secondary battery of claim 1, wherein the film of material capable of receiving and releasing a lithium ion comprises an oxide or a chalcogenide comprising at least one element selected from the group consisting of Al, Ca, Si, Sn, Ge, Pb, Sb, and Bi.

5. The non-aqueous lithium ion secondary battery of claim 1, wherein the film of material capable of receiving and releasing a lithium ion comprises a complex oxide having the formula:

$SnM^1_aO_t$ in which $M^1$ comprises at least two elements selected from the group consisting of Al, B, P, Si, Ge, Pb, Li, Na, K, Rb, Cs, Mg, Ca, Ba, and F; and "a" and "t" are numbers satisfying the conditions of $0.2 \leq a \leq 2$ and $1 \leq t \leq 6$, respectively.

6. The non-aqueous lithium ion secondary battery of claim 1, wherein the film of material capable of receiving and releasing a lithium ion comprises a complex oxide having the formula:

$SnM^3_cM^4_dO_t$ in which $M^3$ is at least one element selected from the group consisting of Al, B, P, Ge; $M^4$ is at least one element selected from the group consisting of Li, Na, K, Rb, Cs, Mg, Ca, Ba, and F; "c" and "d" are numbers satisfying the conditions of $0.2 \leq c \leq 2$, $0.01 \leq d \leq 1$, and $0.2 \leq c+d \leq 2$; and "t" is a number satisfying the condition of $1 \leq t \leq 6$.

7. The non-aqueous lithium ion secondary battery of claim 1, wherein the lithium-containing transition metal oxide film comprising at least two layers is prepared by simultaneous double coating of at least two slurries containing lithium-containing transition metal oxides differing from each other.

8. A non-aqueous lithium ion secondary battery comprising a positive electrode sheet which comprises a lithium-containing transition metal oxide film, a negative electrode sheet which has a film of material capable of receiving and releasing a lithium ion, a non-aqueous electrolyte which contains a lithium salt, and a container which seals the electrodes and electrolyte therein, wherein the lithium-containing transition metal oxide film comprises three layers which are composed of two layers expanding during discharging while shrinking during charging, and one layer shrinking during discharging while expanding during charging, the last layer intervening between the former two layers.

9. A non-aqueous lithium ion secondary battery comprising a positive electrode sheet which comprises a lithium-containing transition metal oxide film, a negative electrode sheet which has a film of material capable of receiving and releasing a lithium ion, a non-aqueous electrolyte which contains a lithium salt, and a container which seals the electrodes and electrolyte therein, wherein the lithium-containing transition metal oxide film comprises three layers which are composed of two layers shrinking during discharging while expanding during charging, and one layer expanding during discharging while shrinking during charging, the last layer intervening between the former two layers.

* * * * *